United States Patent
von Malottki et al.

(10) Patent No.: US 10,695,149 B2
(45) Date of Patent: Jun. 30, 2020

(54) DENTAL IMPLANT, ABUTMENT, IMPLANT SYSTEM AND IMPLANT SET

(71) Applicant: SIC INVENT AG, Basel (CH)

(72) Inventors: Marcus von Malottki, Erkrath (DE); Wilfried Schilli, Freiburg (DE)

(73) Assignee: SIC INVENT AG, Basel (CH)

( * ) Notice: Subject to any disclaimer, the term of this patent is extended or adjusted under 35 U.S.C. 154(b) by 0 days.

(21) Appl. No.: 14/341,237

(22) Filed: Jul. 25, 2014

(65) Prior Publication Data
US 2015/0030993 A1    Jan. 29, 2015

(30) Foreign Application Priority Data
Jul. 26, 2013  (EP) .................................... 13178279

(51) Int. Cl.
*A61C 8/00*  (2006.01)

(52) U.S. Cl.
CPC .......... *A61C 8/0066* (2013.01); *A61C 8/0001* (2013.01); *A61C 8/008* (2013.01); *A61C 8/0022* (2013.01); *A61C 8/0068* (2013.01); *A61C 8/0069* (2013.01); *A61C 8/0071* (2013.01)

(58) Field of Classification Search
CPC ... A61C 8/0066; A61C 8/0068; A61C 8/0069; A61C 8/0022; A61C 8/0071
USPC ................................................. 433/172–176
See application file for complete search history.

(56) References Cited

U.S. PATENT DOCUMENTS

| | | | | |
|---|---|---|---|---|
| 6,672,871 B2 * | 1/2004 | Hurson | ................ | A61C 8/0001 433/172 |
| RE38,945 E * | 1/2006 | Fried | ................... | A61C 8/0066 433/172 |
| 8,920,170 B2 * | 12/2014 | Krivoruk | ............. | A61C 8/0048 433/172 |
| 9,055,988 B2 * | 6/2015 | Galgut | ................. | A61C 8/0001 |
| 2002/0028425 A1 * | 3/2002 | Hurson | ................ | A61C 8/0001 433/202.1 |
| 2007/0092851 A1 * | 4/2007 | Engman | ............... | A61C 8/0066 433/173 |
| 2008/0261176 A1 * | 10/2008 | Hurson | ................ | A61C 8/0022 433/174 |
| 2009/0111072 A1 * | 4/2009 | Lombardo | ............ | A61C 8/005 433/174 |
| 2009/0123890 A1 * | 5/2009 | Purga | ................... | A61C 8/0018 433/174 |
| 2010/0248180 A1 * | 9/2010 | Bondar | ................ | A61C 8/0001 433/141 |
| 2010/0248181 A1 | 9/2010 | Kremer et al. | | |

(Continued)

FOREIGN PATENT DOCUMENTS

| | | |
|---|---|---|
| CN | 201 160 908 | 12/2009 |
| CN | 101 732 097 | 6/2010 |

(Continued)

*Primary Examiner* — Matthew M Nelson
(74) *Attorney, Agent, or Firm* — Henry M. Feiereisen LLC

(57) ABSTRACT

A dental implant for insertion in a jaw bone has a receiving opening arranged on a coronal end of the dental implant for an abutment, the receiving opening when viewed from the coronal end having a taper section and an indexing section, the indexing section having at least one outwardly extending groove arranged along a circular circumference, the taper section having a conical angle of less than 3°.

9 Claims, 12 Drawing Sheets

(56) References Cited

U.S. PATENT DOCUMENTS

| | | | | |
|---|---|---|---|---|
| 2011/0183290 A1* | 7/2011 | Galgut | A61C 8/0001 | 433/174 |
| 2011/0318707 A1* | 12/2011 | Better | A61C 8/0018 | 433/174 |
| 2012/0064488 A1* | 3/2012 | Lazarof | A61B 17/8625 | 433/174 |
| 2012/0077151 A1* | 3/2012 | Nary Filho | A61C 8/006 | 433/174 |
| 2012/0189980 A1* | 7/2012 | Kuehne | A61C 8/0018 | 433/141 |
| 2012/0214130 A1* | 8/2012 | Krivoruk | A61C 8/0048 | 433/173 |
| 2012/0270180 A1* | 10/2012 | Dahlstrom | A61C 8/005 | 433/173 |
| 2012/0301850 A1* | 11/2012 | Sollberger | A61C 8/005 | 433/174 |
| 2013/0143178 A1* | 6/2013 | van Ophuysen | A61C 8/0054 | 433/173 |
| 2013/0183637 A1* | 7/2013 | Purga | A61C 8/0018 | 433/174 |
| 2013/0244203 A1* | 9/2013 | Magnusson | A61C 8/0054 | 433/173 |
| 2013/0252204 A1* | 9/2013 | Boehlen | A61C 8/0054 | 433/173 |
| 2013/0260336 A1* | 10/2013 | Bondar | A61C 8/0001 | 433/173 |
| 2014/0170597 A1* | 6/2014 | Honig | A61C 8/0053 | 433/173 |

FOREIGN PATENT DOCUMENTS

| | | |
|---|---|---|
| EP | 2570097 A1 | 3/2013 |
| WO | WO2011/089057 A1 | 3/2011 |
| WO | WO2012/123654 | 9/2012 |

* cited by examiner

FIG. 7
FIG. 8
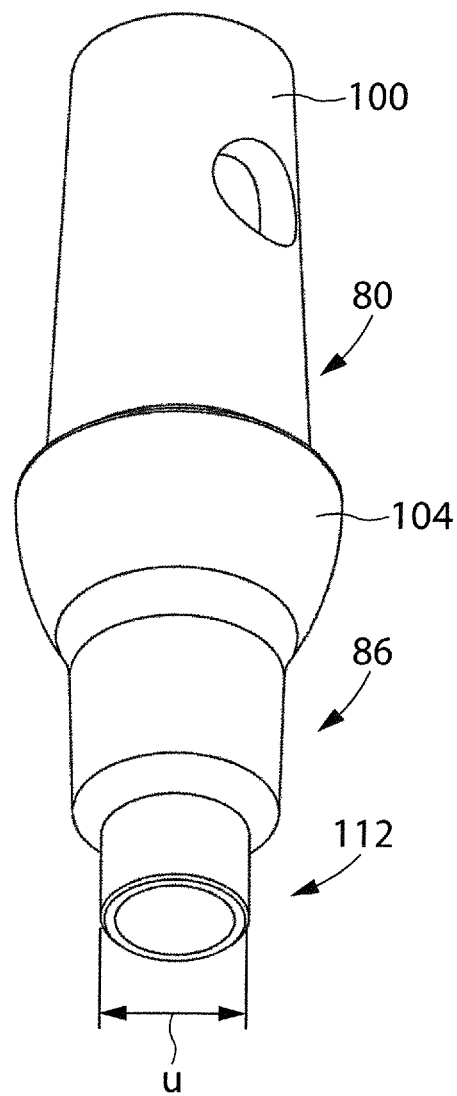
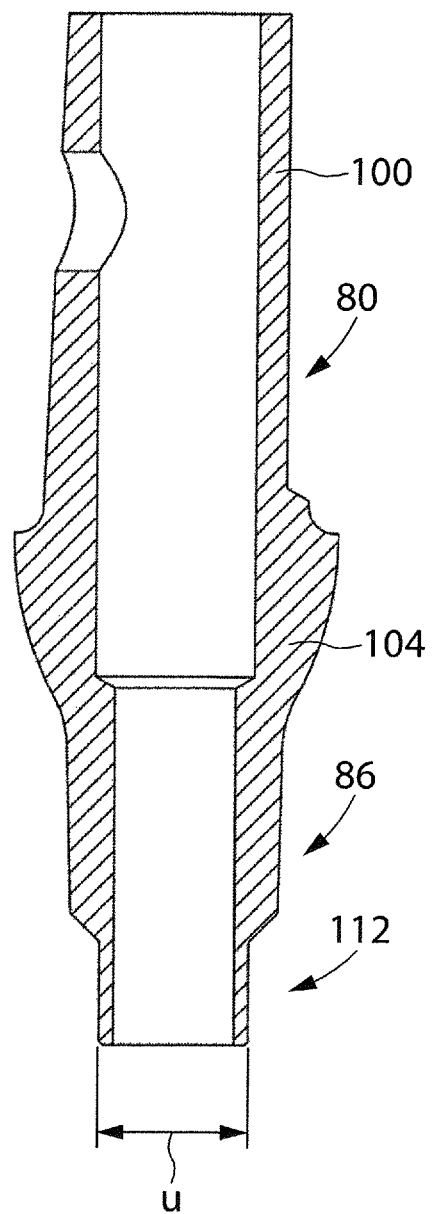

FIG. 9
FIG. 10
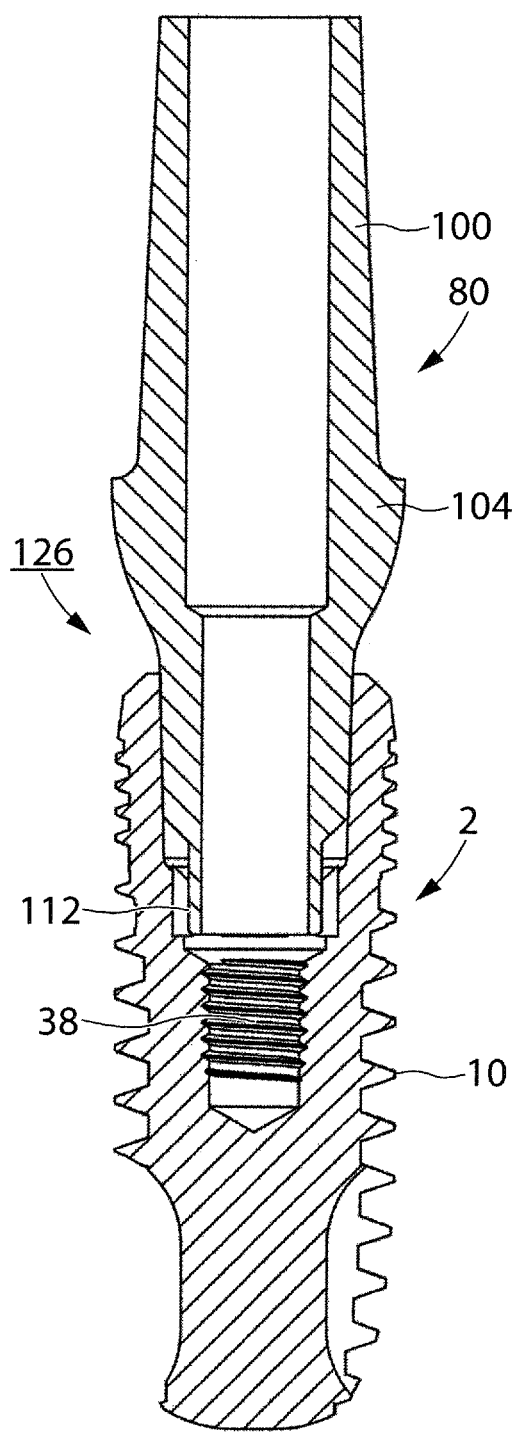
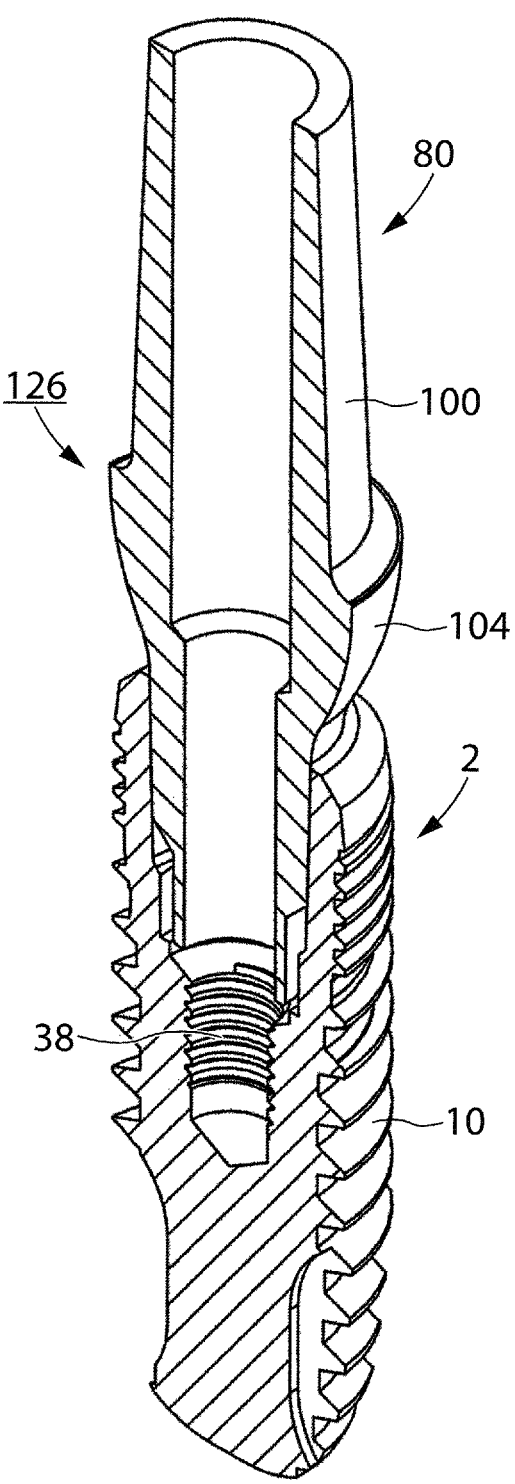

FIG. 11
FIG. 12
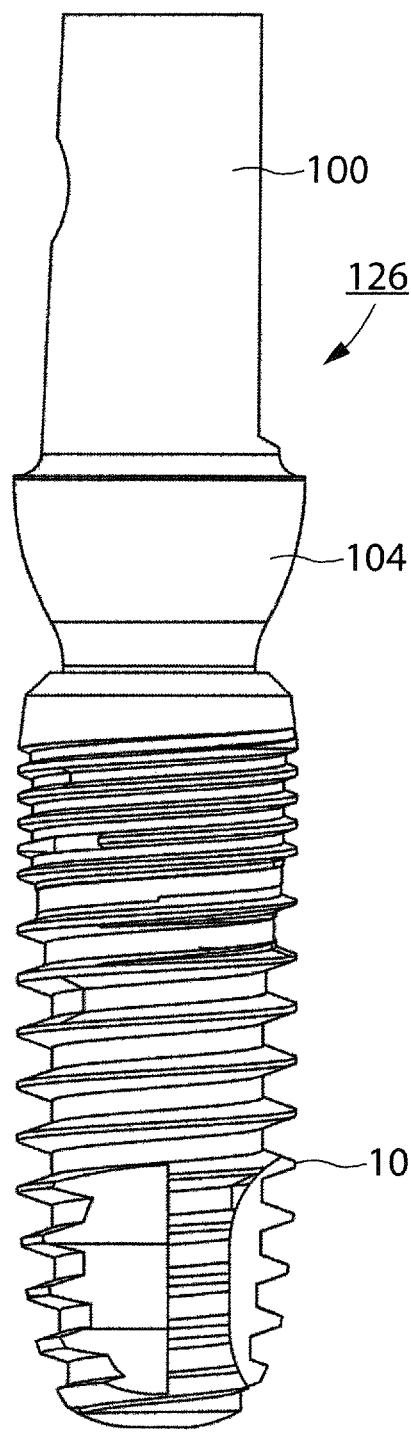
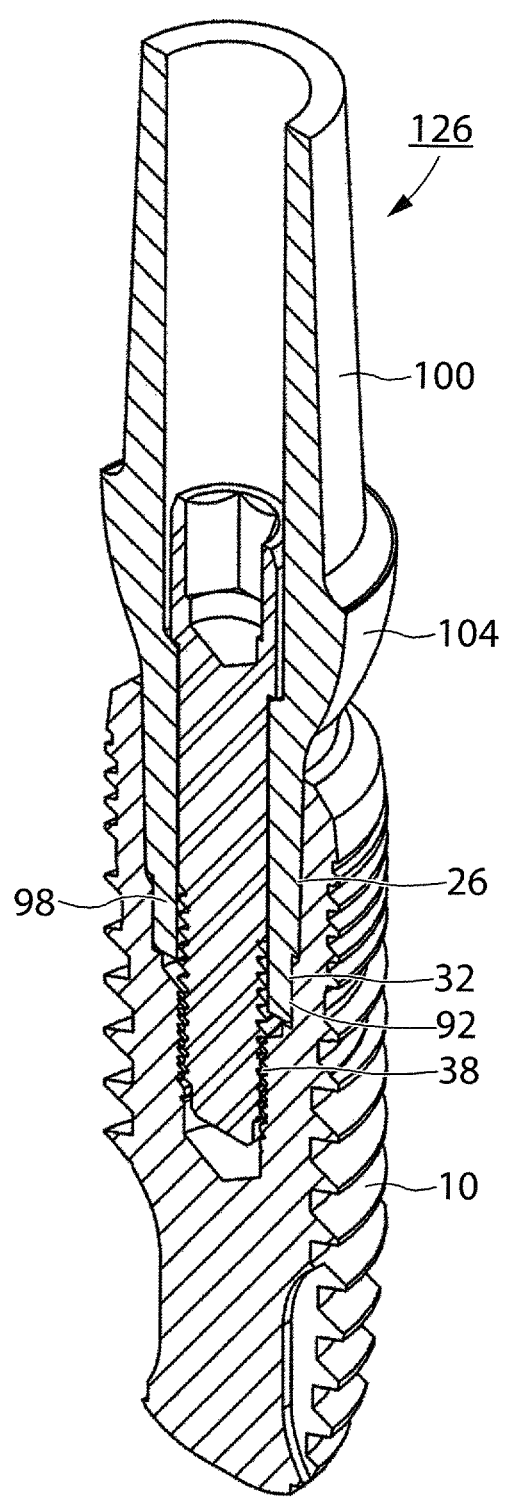

FIG. 25
FIG. 26
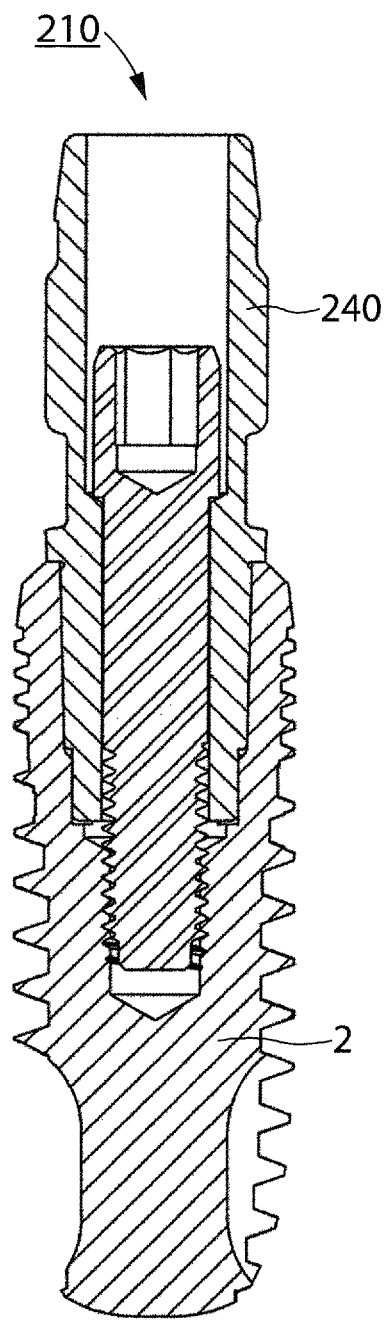
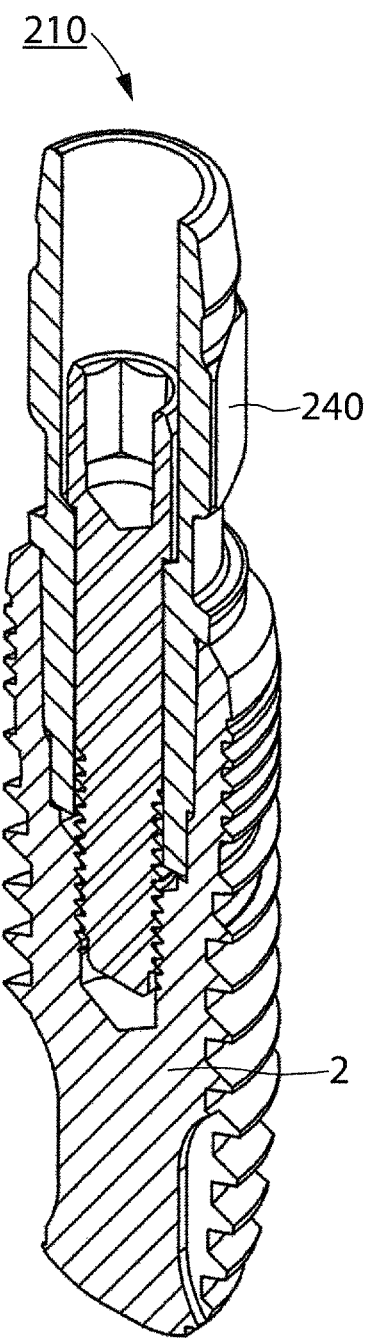

DENTAL IMPLANT, ABUTMENT, IMPLANT SYSTEM AND IMPLANT SET

CROSS-REFERENCES TO RELATED APPLICATIONS

This application claims the priority of European Patent Application, Serial No. EP13178279, filed Jul. 27, 2013, pursuant to 35 U.S.C. 119(a)-(d), the disclosure of which is incorporated herein by reference.

BACKGROUND OF THE INVENTION

The present invention relates to a dental implant, an abutment, an implant system and an implant set.

The following discussion of related art is provided to assist the reader in understanding the advantages of the invention, and is not to be construed as an admission that this related art is prior art to this invention.

The treatment of a patient with artificial dental prostheses, which replace the previously present natural teeth, usually has esthetic as well as medical reasons. On one hand the impression of a complete set of teeth can be created. On the other hand the absence of teeth can also lead to physical changes in the bone structure in the region of the jaw, displacements or "migrating" of the still present teeth in the direction of the generated gap, or to extrusion of the opposing teeth.

When a dental implant is used as artificial prosthesis it is inserted, in particular screwed, into the generated gap in the jawbone, where it securely grows together with the bone. An abutment is received by the implant which abutment then carries the visible prosthesis such as a crown.

The interface between abutment and implant is usually configured conical in a first part or subsection. A rotatively fixed region which adjoins thereon for example an internal hexagon of the implant which receives an outer hexagon of the abutment for forming a form fitting connection prevents that the abutment rotates relative to the implant over time due to the forces occurring in the mouth (in particular due to chewing movements). An indexing facilitates a precise transmission of the implant orientation to a master model and with this also the exact modeling and fit of the prosthesis.

From WO 2011/089057 A1 a dental implant is known which has a conical part and an indexing part adjoining the conical part. The total conical angle is in this case 6° to 20°.

A disadvantage of a total conical angle in this range is that on one hand only a relatively small clamp travel during insertion of the abutment into the implant is available during application, in particular during tight screwing, on the other hand due the small surface pressure a shallow angle weakens the force fit and with this the stability of the abutment and may lead to a tilting of the abutment relative to the implant.

It would therefore be desirable and advantageous to provide to provide an improved dental implant, which has a high overall stability, reliability and durability.

SUMMARY OF THE INVENTION

According to one aspect of the present invention, a dental implant for insertion in a jaw bone has a receiving opening arranged on a coronal end of the dental implant for an abutment, the receiving opening when viewed from the coronal end having a taper section and an indexing section, the indexing section having at least one outwardly extending groove arranged along a circular circumference, the taper section having a conical angle of less than 3°.

The invention is based on the idea that when using a dental prosthesis in the dental care of a patient, the durability and reliability of the dental implant are of paramount importance. The basis for this the overall stability of the system consisting of implant and abutment. The forces generated in the mouth by chewing or biting movements are transmitted to the implant via the abutment and from the implant into the bone. For this reason, interfaces or transitions from the abutment to the implant and from the implant to the bone are also relevant for the stability. For meeting the requirements mentioned above, the chewing forces which are introduced via the abutment, in particular pushing forces should be introduced into the implant in vertical direction as deeply as possible. In addition the dynamic elastic load acting on the bone should be kept as small as possible.

The deep transmission of pushing forces cannot be achieved with a rather shallow taper because due the predetermined outer diameter of the implant, the shallow taper does not reach far enough into the implant in vertical direction. However, as was recognized, this object is achieved by a steep taper with taper angles in the range of 1° to 3°, the so-called Morse taper. At a predetermined implant length and thickness, the steep angle allows realizing a relatively long interface. An indexing or retention section which adjoins the steep taper section allows forces to be transmitted even deeper into the implant. The steep angle further leads to an even and relatively slow increase of the implant wall thickness. Consequently the cross section decreases relatively slowly with increasing depth. This enables a retention section with relatively great cross section which naturally cannot be greater than the smallest diameter of the taper section because otherwise the abutment would not be able to be passed through.

A groove defines a preferred direction and an orientation. When multiple grooves are provided at even distances to each other, this defines a multiple symmetries. As a result of the large cross section and at least one groove, a large contact surface is created via which forces can be transmitted. This relatively large contact surface between outer dimension of the abutment and the inner geometry of the implant the implant volume which results from the implant cross section reduce the curvature of the implant body. As a result, the elastic deformation of the implant body is reduced, thereby reducing the above mentioned load acting on the bone.

As was further recognized, a now proposed configuration of the implant offers the possibility to achieve a particularly fatigue resistant connection to the abutment without additional connecting elements such as fixing screws, owing to the self inhibition or cold welding of the Morse taper, without having to sacrifice a defined selection of indexing directions. Of course the fixing of abutment and implant can also additional occur or be supported by a connecting element, which increases the durability even further.

The possibility to produce fatigue resistant implant—abutment connection without connecting element makes the production of particularly short implant possible in which no inner threading is required. These short implant forms are particularly advantageous when used in small vertical available bone and for avoiding invasive bone-augmenting surgical measures.

Dental constructs for use in dental technology have to be produced with a high vertical precision because in the human jaw the chewing planes are finely tuned to each other. These high demands on the vertical tolerance previously stood in the way of using the so-called Morse taper because according to conventional believe this design can not simply be combined with an indexing part adjoining the Morse taper. In particular when the abutment enters deep into the implant with the taper section or is fully inserted into the implant it may run against the ends of the implant in the rotation-proof region thus preventing the desired cold welding in the taper region. On the other hand an insufficiently deep insertion of the abutment into the rotation-proof region leads to an insufficient securement against rotation.

However, it was surprisingly discovered that the demand on the small vertical tolerances can be met in manufacturing and that these vertical tolerances can be kept sufficiently small within economically sensible ranges (i.e., the waste can be kept sufficiently low) that the configuration according to the invention can be technically realized.

Within the context of this application "implant" means the component which is directly anchored in the bone and receives an abutment which is inserted into the implant and is in particular screwed together with the implant. Implant system means the combination of implant associated abutment and as the case may be further components for example fixing screw.

The indexing section preferably directly adjoins the conical section when viewed from the coronal end, in particular by forming a step. As an alternative a conical or cylindrical intermediate section can be provided which for example can serve as guide section.

Preferably the taper angle is between 1° and 3° in particular 1.4°. Such a steep taper promotes the tendency for cold welding and with this the mechanical strengthening of the connection between the abutment and implant in the assembled state. This also achieves a particularly efficient sealing against bacteria.

In a preferred embodiment the respective groove has two side surfaces which are respectively oriented perpendicular to a common end surface, which is arranged perpendicular to an imagined line which extends radially from a center axis of the implant. In the case of engagement of a cam of an abutment, which cam is form congruent to this groove, no lateral friction forces are generated in the case of a relative rotation and the forces are transmitted from the surfaces of the abutment substantially in normal direction to the implant.

The grooves are preferably configured as parallel-walled prisms, wherein the side surfaces extend substantially parallel to the center axis of the implant. When an abutment is inserted into the implant with at least one cam, which can be brought into engagement with the groove which is configured in this way, no push frictions are generated when the implant and the abutment rotate relative to each other in opposite directions, as they would be generated for example when the interface was formed by an inner hexagon of the implant and an outer hexagon of the abutment, which can be brought into engagement with the inner hexagon if the implant. The provided shape of the groove causes the forces generated during a relative rotation of the abutment and the implant to be substantially introduced vertically into the surfaces so that deformations of the surfaces are avoided. In the case of high acting torques and the pressing of the outer surfaces of the abutment against the inner surfaces of the implant, the tendency for cold welding—which is undesired in this section—is strongly reduced due to the perpendicular and even introduction of the forces.

In a preferred embodiment, exactly four grooves are arranged along the circumference at even distances to each other. Such a configuration corresponds in its shape of the grooves to the "Swiss Cross".

Preferably the ratio of a free angle along which on the circular circumference covered region non groove is arranged and a groove angle along which on the circular circumference covered region a groove is arranged between 1.0 and 0.5 in particular between 0.61 and 0.84. a ratio of 1.0 means in the four provided grooves that the two angles free angle and groove angle are of the same size and with this the value of the covered circular circumference sections or the respective corresponding arc length of this circular circumference section is of equal size. When the ratio is smaller than 1.0 the arc length of the circular circumference along a groove is greater than the one without groove. The smaller the ratio, the wider are the grooves at constant circular circumference.

A ratio in the range of 0.61 and 0.84 is particularly advantageous because it results in a mechanically favorable ratio between depth of the grooves or side surface and total distance of the grooves to each other. As a result of the relatively large end surface the side surface increases proportionally. The side surface is to be as great as possible for transmitting the required inserting rotational torques and for avoiding a cold welding. On the other hand the total distance of the grooves is to be as small as possible so that the cross sectional surface of the implant body and the geometrical moment of inertia under bending and torsion stress is as great as possible.

Further a wide groove with shallow groove depth is easier to manufacture with highest precision than a narrow deep groove.

Finally in the case of a wide groove the enclosed hollow space which results as volume of enclosed arc length of the circular circumference between two grooves and the connecting straight line of the surface of the abutment and the side surfaces is reduced. This minimizes contamination of the implant interior with fluids and bacteria.

The three fundamental considerations and practical tests have lead to the finding that the ratio smaller than 1.0, wherein thus the arc length of the circular circumference along a groove is greater than the one without groove, is advantageous for the configuration of the indexing section of the implant-abutment-interface.

On the indexing section preferably a circular support surface for supporting the introduction for an abutment is formed. This makes it easier for the physician or dental technician to introduce and fit the abutment because the introduction and orienting are two movements that can be performed separate from and subsequent to each other. The abutment can first be inserted into the implant until it rests on the support surface. Thereafter the engagement with the grooves can be achieved by rotating the abutment in the one or the other direction. Thereupon the abutment is further inserted or pushed into the implant in the now set orientation.

in a preferred embodiment, an inner threading adjoins the indexing section viewed from the coronal end of the implant. This then receives a fixing screw for screwing the abutment together with the implant or for fixing the abutment.

In the described implant an inner threading is not necessarily required however, so that the mechanical connection between the implant body and an abutment is ensured solely via the cold welding of the contact surface of the Morse taper. A fatigue resistant connection can be achieved based on the selected taper angle solely due to the self inhibition of the steep Morse taper. In an alternative embodiment the implant thus has no inner threading. A defined indexing does not have to be sacrificed however.

According to another aspect of the invention an abutment, for insertion into a dental implant, in particular a dental implant as described above, has a taper section and an indexing section, wherein the taper section has a taper angle of less than 3°.

Advantageously the indexing section has a number of cams which are arranged on a circular circumference and which can be brought into engagement with grooves of a dental implant. Cams and grooves thereby form a rotation-proof connection. In such a configuration the abutment can be inserted into the implant in a number of defined orientations, wherein the orientations are defined by the fact that cam(s) and groove(s) engage in each other for forming a form fitting connection.

In a preferred embodiment, exactly four cams are provided which are arranged at an even distance along a circular circumference. The cams preferably have a rectangular contour which traces the circular circumference and are formed as prisms, which extend along a center axis of the abutment.

In the abutment an inner threading can be provided preferably in a region of the screw channel. By screwing a special tool into the abutment, the abutment—in spite of cold welding which may have occurred in the taper region—can be released again from the implant.

According to another aspect of the invention an implant system includes a dental implant for insertion in a jaw bone, the implant having a receiving opening arranged on a coronal end of the dental implant, said receiving opening when viewed from the coronal end having a first taper section and a first indexing section, the first indexing section having at least one outwardly extending groove arranged along a circular circumference; and an abutment received in the receiving opening of the dental implant, the abutment including a second taper section and a second indexing section, the first taper section and the second taper section having an angle of less than 3°, the first and second taper sections being dimensioned so as to contact each other at least partially, in particular so as to form a self inhibiting connection with each other in the assembled state.

The respective taper sections and indexing sections of the implant and the abutment are advantageously dimensioned so that a greatest possible contact surface is created and so that at the same time the indexing sections overlap over a greatest possible degree. In particular, preferably the respective taper angles in the implant and the abutment are identical or correspond to the most degree with each other. Such a configuration is made possible by smallest possible manufacturing tolerances of the inner or outer geometry of the implant or the abutment.

According to another aspect of the invention an implant system, includes a dental implant for insertion in a jaw bone, the implant having a receiving opening arranged on a coronal end of the dental implant, the receiving opening when viewed from the coronal end having a first taper section and an indexing section, the indexing section having at least one outwardly extending groove arranged along a circular circumference; and an abutment received in the receiving opening of the dental implant, the abutment including a second taper section and a cylindrical guide section receivable in the indexing section of the dental implant, the first taper section and the second taper section having an angle of less than 3°, the first and second taper sections being dimensioned so as to contact each other at least partially. This means the implant has still an indexing section with at least one groove. This indexing section however is only used partially by the abutment, namely not for determining a defined indexing but as guide section during the insertion of the abutment into the implant, which in the assembled state leads to a high strength.

In the abutment a through channel for the passage of a fixing screw is preferably provided. The fixing screw in the assembled state is guided through the abutment into the implant where it is screwed tight in the inner threading of the implant. In such a configuration the fatigue resistant connection of the two components is not only realized by the cold welding of the taper sections but also by the inserted screw.

Regarding the implant set, the object mentioned above is solved with an implant as described above and at least one auxiliary element from the group: impression post, gingiva-former, insertion post. The implant set further includes preferably an abutment as described above.

The advantages of the invention are in particular that as a result of a connection of a Morse taper with an adjoining indexing section and the resulting possibility of the deep introduction of forces acting on the abutment, an implant and an implant system can be created with high reliability and durability.

As a result of the configuration of the taper section as Morse taper a high self inhibition by friction fit and the tendency for cold welding is realized. As a result a form fitting and force fitting connection between the abutment and the implant is generated. Due to the cold welding a maximal functional sealing against contamination is also realized. In particular in the case of an implant interface, which is anchored in the implant over a length of 4 mm, only a minimal widening and bulging of the contact surface should occur even under dynamic load. With this a maximal tightness against entering fluids and bacteria is ensured.

Due to the reduced elastic deformation resulting from the inner geometry and with this reduced loads acting on the bone, the tendency to bone degradation is reduced.

The parallel-walled side surfaces of the grooves provided for securement against rotation and oriented at 0° relative to introduced torques, realize a particularly advantageous shape in which no push frictions are generated, which would for example be generated by an oblique force introduction in a hexagon. Thus there is no tendency that the high torques during screwing in the implant involving high surface pressures on the transmission surfaces, lead to cold welding of the retention surfaces. This means that a desired cold welding can be achieved in a targeted manner in the taper part while at the same time an undesired cold welding in the indexing part can be avoided.

As a result of a circular support surface adjoining the taper, the abutment can be supported during introduction without jamming in an intermediate position. The treating dental technician or the physician can locate the index of the interface by rotating the abutment in any direction. Thereby the abutment softly and quasi automatically glides with the cams into the inner contour of the implant interface.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 7 shows an abutment in a second preferred embodiment in a perspective view, FIG. 8 shows the abutment according to FIG. 7 in a side section, FIG. 9 shows an implant system with a dental implant according of FIGS. 1 to 3 and an abutment according to FIGS. 7 and 8, FIG. 10 shows the implant system according to FIG. 9 in a side-perspective section, FIG. 11 shows an implant system with a dental implant according to FIGS. 1 to 3 and an abutment according to FIGS. 4 to 6 in a perspective view from outside, FIG. 12 shows the implant system according to FIG. 11 in a perspective section, FIG. 25 shows an implant set with a insertion post and a dental implant according to FIGS. 1 to 3 in a preferred embodiment in a side section, FIG. 26 shows the implant set according to FIG. 25 in a perspective sections and FIG. 27 shows a representation of the cross section of a dental implant for explaining the free angle and the groove angle.

DETAILED DESCRIPTION OF PREFERRED EMBODIMENTS

Figure 1:
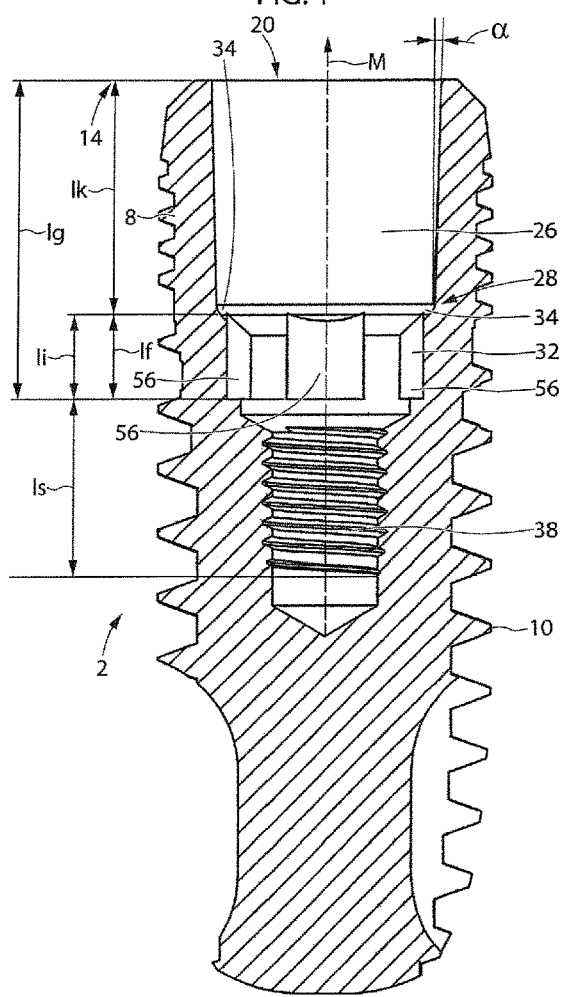
FIG. 1 shows a dental implant with a conical section and an indexing section in a preferred embodiment in a side section.
Figure 2:
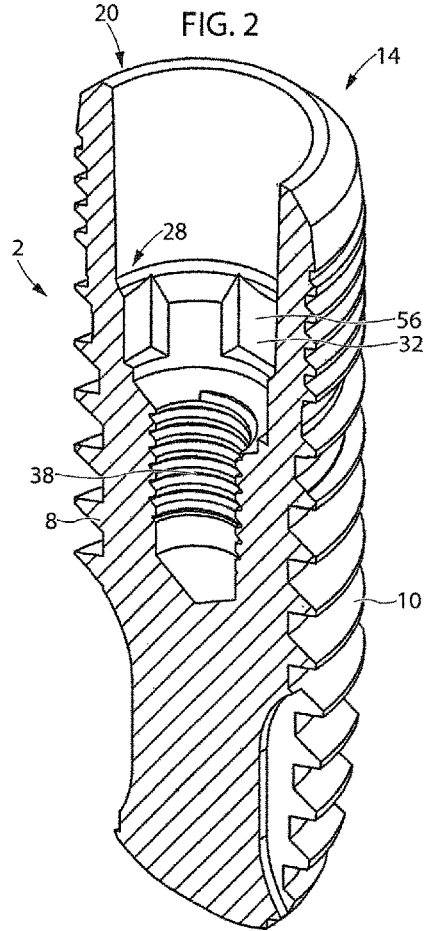
FIG. 2 shows the dental implant according to FIG. 1 in a perspective section.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

A dental implant 2 shown in a side section in FIG. 1 and in a perspective section in FIG. 1, has an implant body 8, which is made substantially from pure titanium Grade 4 and an outer threading 10. Other preferred materials are for example titanium Grade 5 or titanium alloys.

At a coronal end 14 the dental implant 2 has a receiving opening 20 for receiving an abutment. Viewed from the direction of the coronal end 14 the receiving opening 20 has a conical section 26 which is rotation symmetrical around a center axis M and a substantially adjoining indexing section 32 which thereby forms a step 28. Adjoining thereon is a threading 38, which is configured as inner threading and serves for receiving a fixing screw by which an abutment can be screwed to the implant.

The dental implant 2 is configured to transmit the forces, which act on the abutment or the artificial prosthesis and which are in particular generated by chewing, grinding and biting movements, as evenly and deeply as possible into the implant. For this at the same time a deep conical connection with a tendency for cold welding is combined with a rotation-proof connection.

A conical angle α of the taper section 26 (i.e., the angle between an imagined line parallel to the center axis of the dental implant 2 and an imagined line through the outer surface of the implant) is 1.4°, so that the conical section is thus configured as Morse taper. The taper angle α corresponds to half of the so-called total taper angle. Such a steep taper allows a relatively long conical section in which the abutment and the implant form a form fitting and force fitting connection. Due to the large contact surface, forces can be conducted from the abutment deep into the implant. Due to the adjoining rotation-proof part, forces can be introduced even deeper whereby there rotational forces can also be absorbed. Overall a very deep force transmission is therefore possible.

In the present exemplary embodiment, the taper section 26 has a taper length $l_k$ of 3 mm. The radius of the taper section 26 becomes smaller in a transitional section 34 bordering the indexing section 32 in the manner of a convex contour. The radially narrowing region forms a rounded step 28 between the taper section 26 and the indexing section 32.

An indexing length $l_i$, which defines the length of the indexing section 32, is 1 mm, so that the total length $l_g$, the sum of conical length $l_k$ and indexing length $l_i$, is 4 mm. The threading 38 has a threading length $l_s$ of 2.3 mm.

Figure 3:
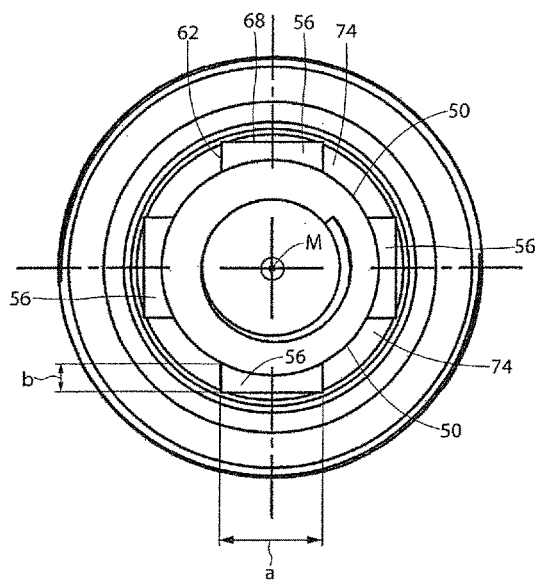
FIG. 3 shows the inner region of the dental implant according to FIGS. 1 and 2 in a cross section.

The indexing section 32 is shown in a cross section in FIG. 3. Along a circular circumference 50 four grooves 56 are arranged in a configuration resembling the "Swiss Cross". Each of the four grooves has respective side surfaces 62, which are each positioned perpendicular to a common end surface 68.

The side surfaces 62 have preferably—in the direction of the center axis M—a length $l_f$ of 0.8 mm to 1.5 mm, in particular and in the present exemplary embodiment 1 mm. The length $l_f$ corresponds hereby to the length $l_i$ of the indexing section 32. Depending on the interface diameter an end surface width a is preferably 0.7 mm to 1.0 mm and the depth of the grooves or side surfaces b is preferably 0.1 mm to 0.4 mm depending on the interface diameter. In the shown exemplary embodiment the length $l_f$ is 1.0 mm, the end surface width a is 1.0 mm and the side surface depth b is 0.30 mm.

The indexing section 32 includes in a manner of speaking four parallel prisms which are arranged along the circular circumference 50 and which are 1 mm in height in axial direction. The grooves 56 extend hereby over the entire indexing length $l_i$. Such a configuration is suited for highest torques and does not show any tendency for cold welding when an abutment or screw-in tool is used which has a shape congruent outer contours, i.e., which has four cams on a circular circumference, which can be brought into engagement in grooves 56. In addition this interface provides a minimal rotational play. The interface between the implant and the abutment is configured as groove cam connection.

The recess of parallel-walled prisms or grooves 56 forms, when viewed from the coronal end 14 of the implant 2, a support surface 74 for an abutment. An abutment which has an outer contour with four cams which is shaped congruent to the inner shape of the indexing region 32 can initially be placed on the support surface 74 before it is inserted into the dental implant 2 for final fixation. By rotating the abutment clockwise or counter clockwise the desired orientation of the abutment can be sought. As soon as the desired orientation is determined the abutment can then be pushed into the implant. The support surface 74 defines an intermediate or in-between position during insertion of the abutment. The side surfaces 62 and the end surfaces 68 serve as guide surfaces for the abutment during insertion.

Figure 4:
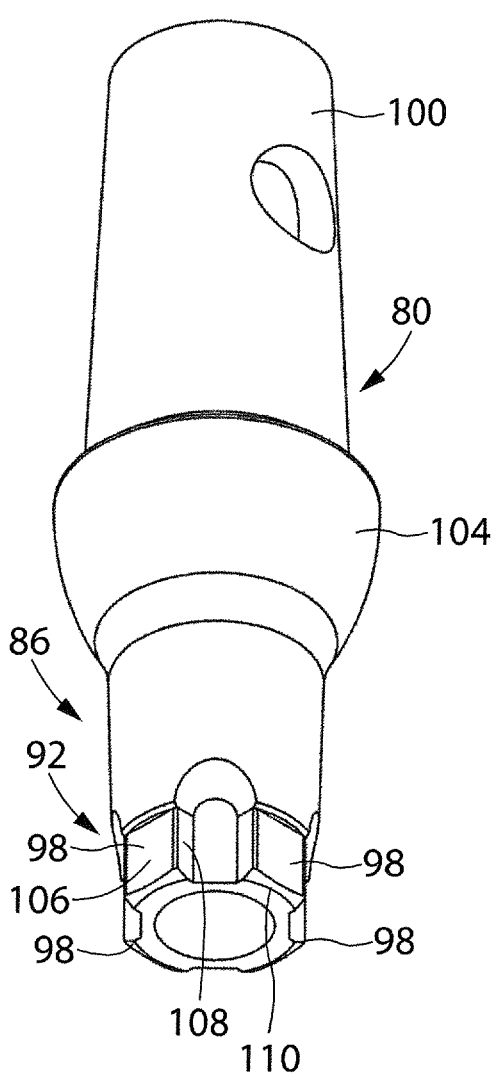
FIG. 4 shows an abutment in a first preferred embodiment in a perspective view.

An abutment 80 in a first preferred embodiment is shown in a perspective view in FIG. 4 and has a taper section 86 and an indexing section 92. The taper section 86 has a taper angle a which corresponds to the taper angle a of the dental implant 2. When inserting the abutment 80 into the dental implant 2 a self inhibiting connection, which tends to cold welding, is realized between the taper section 86 of the abutment 80 and the taper section 26 of the dental implant due to the small taper angle α.

Figure 6:
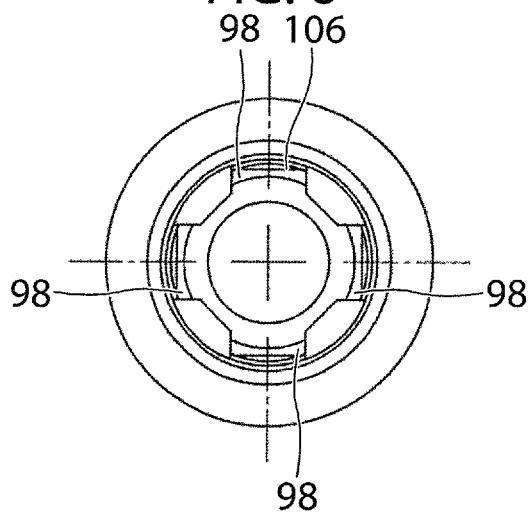
FIG. 6 shows the abutment according to FIGS. 4 and 5 in a cross section.

The indexing section 92 of the abutment 80 has four cams 98, which are configured as parallel-walled prisms, and in the assembled state can be brought into engagement with the grooves 56 of the dental implant 2, thereby generating through a form fit a rotation-proof connection between the dental implant 2 and the abutment 80. The abutment has in a coronal region a functional part 100 for fastening artificial dental prostheses, in particular for cementing a crown. The cams 98 have a contour, which is congruent to the grooves 56 of the dental implant 2. The cams 98 each have an end face 106 and two side surfaces 108 which are perpendicular thereto and which are arranged along an imagined circular circumference. Between the functional part 100 and the taper section 86 the abutment 80 has a gingiva section 104, which has an emergence profile for forming the gingiva. A cross section through the abutment 80 is shown in FIG. 6. The abutment 80 has an inner threading 114 or inner screw threading for inserting a special tool. This makes it possible to release the abutment 80 again from the dental implant 2 even when the two taper sections 26, 86 are already cold welded to each other.

An abutment 80 in a second preferred embodiment is shown in a perspective view in FIG. 7. In contrast to the abutment 80 according to FIG. 4, the abutment 80 according to FIG. 7 has no indexing section. Instead it includes a cylindrical guide section 112. An outer diameter u is dimensioned so that it corresponds to the diameter of the circular circumference 50 of the dental implant 2. When inserting the here shown abutment 80 into the dental implant 2, the guide section 112 serves for guiding the abutment 80 while it is inserted into the dental implant 2. An indexing is hereby not effected. The treating physician or dental technician can thus freely choose the orientation of the abutment 80 relative to the dental implant 2 during the insertion procedure.

FIGS. 9 and 10 show an implant system 126 in a first preferred embodiment with a dental implant 2 shown on top and an abutment 80 according to FIGS. 7 and 8 which instead of an indexing section has a guide section 112. Here, the abutment 80 is fully inserted into the dental implant 2 and can be compressed when the patient bites down on the crown or it can be screwed tight with a—not shown—fixing screw.

Figure 5:
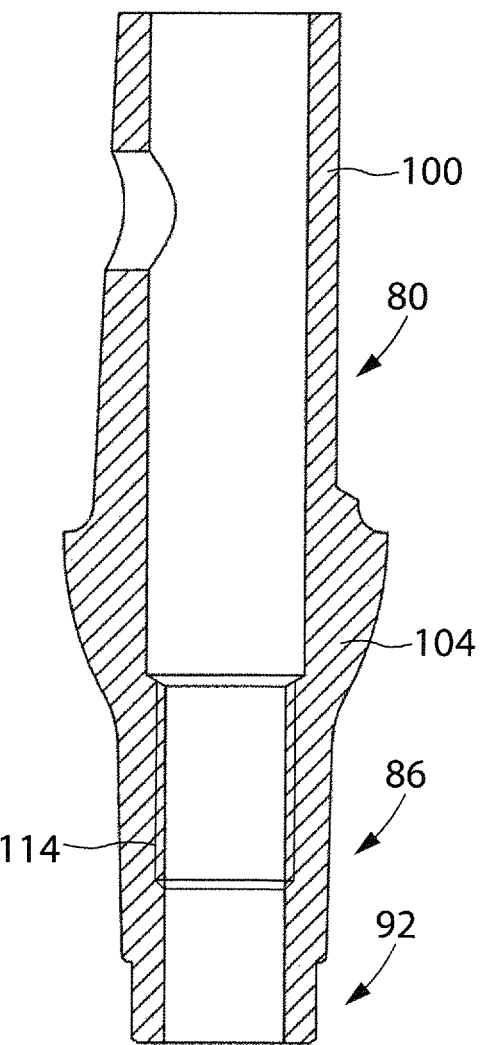
FIG. 5 shows the abutment according to FIG. 4 in a side section.

FIGS. 11 and 12 show an implant system 126 in a second preferred embodiment in which the abutment 80, which is shown in FIGS. 4, 5 and 6, includes an indexing section 932 with four cams 98 resulting in four different orientations in the indexing section 32 of the dental implant 2.

Figure 13:
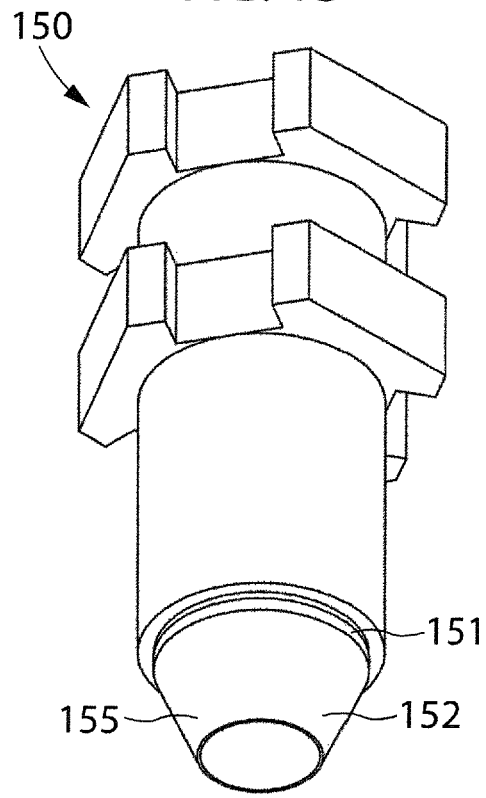
FIG. 13 shows an impression post for an implant set in a preferred embodiment in a perspective view.
Figure 14:
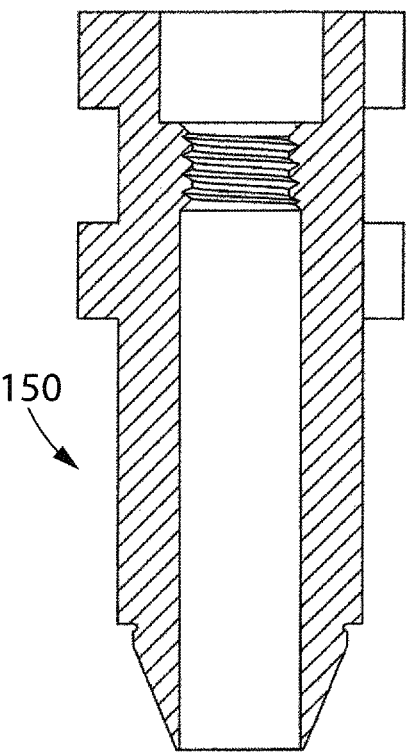
FIG. 14 shows the impression post according to FIG. 13 in a side section.
Figure 15:
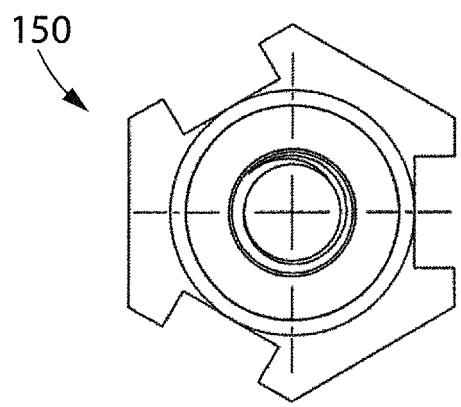
FIG. 15 shows the impression post according to FIGS. 13 and 14 in a cross section.

A impression post 150 shown in FIGS. 13 to 15 in a first preferred configuration has a conically shaped insertion section 152 which is inserted into the taper section 26 of the dental implant 2 during forming the impression. With this special impression post 150 multiple dental implants 2, which may also strongly differ from each other or be skewed, can be molded. In the dental reconstruction these implants are grouped together and thus interlocked. Due to the interlocking, the position and orientation of the index of the implants is not required. The connection design starts after the support shoulder with a short (0.3 mm long) taper 151 whose angle follows with the conical angle of the dental implant 2. Following this is a further taper 155 whose angle is significantly greater. Particularly advantageous is an angle of 25° to 35°. The flat taper 155 facilitates pulling off the impression tray owing to a resulting common pull-off direction, and correspondingly offers sufficient possibilities to pull insertion posts, which are arranged at an angle to other, out of the implant without noticeable deformation of the impression material.

Figure 16:
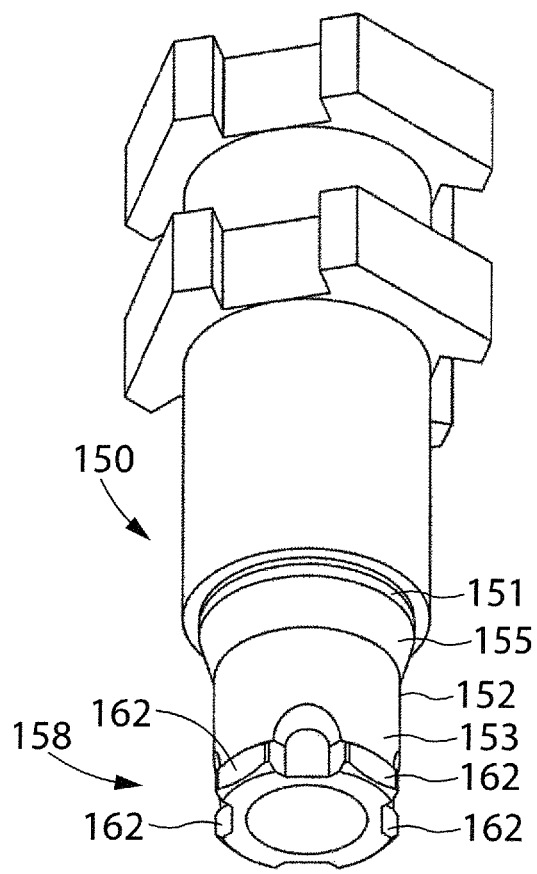
FIG. 16 shows an impression post for an implant set in a second preferred embodiment in a perspective view.
Figure 17:
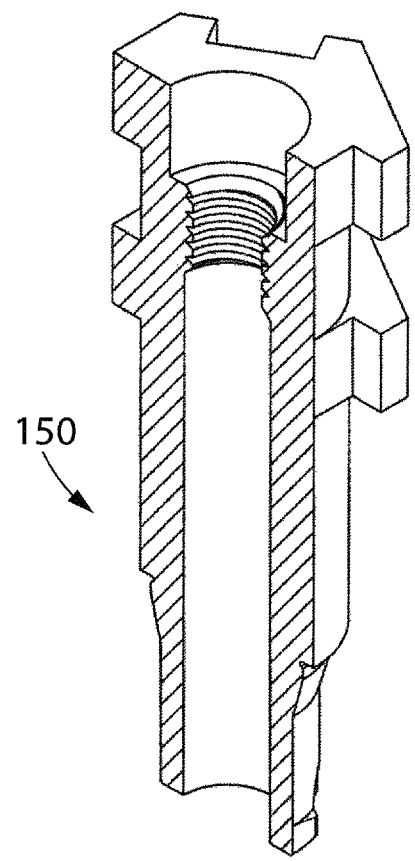
FIG. 17 shows the impression post according to FIG. 16 in a side section.
Figure 18:
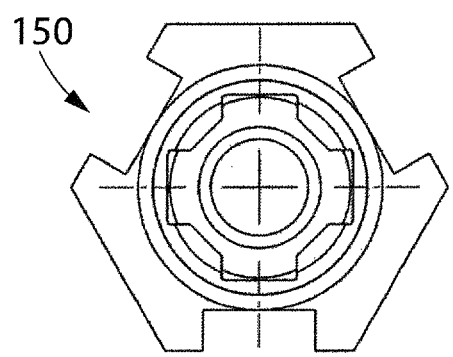
FIG. 18 shows the impression post according to FIGS. 16 and 17 in a cross section.
Figure 19:
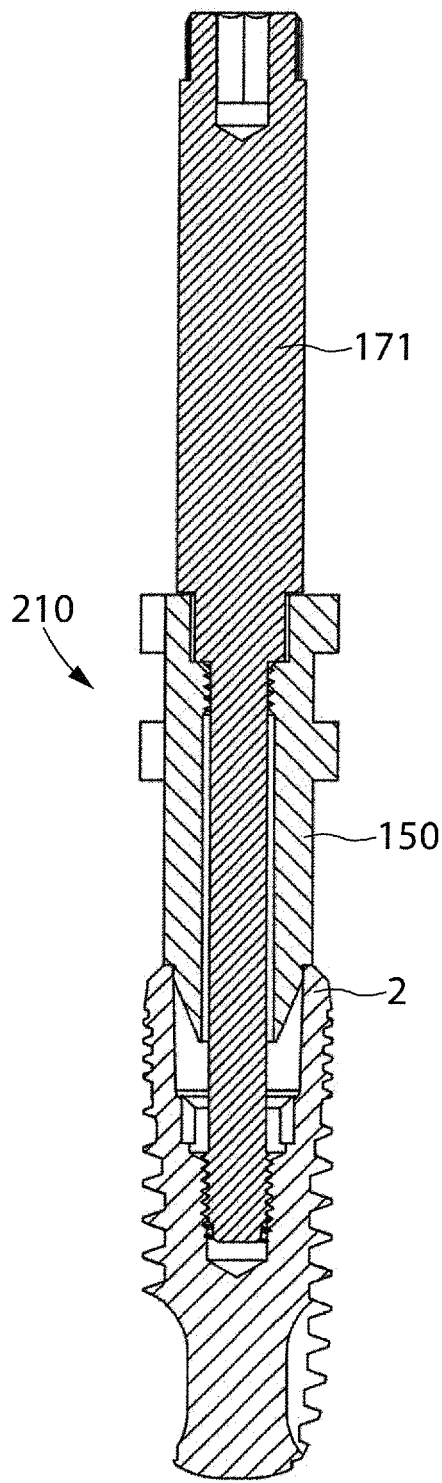
FIG. 19 shows an implant set with an impression post according to FIG. 18, a fixing screw and a dental implant according to FIGS. 1 to 3 in a preferred embodiment in a side section.
Figure 20:
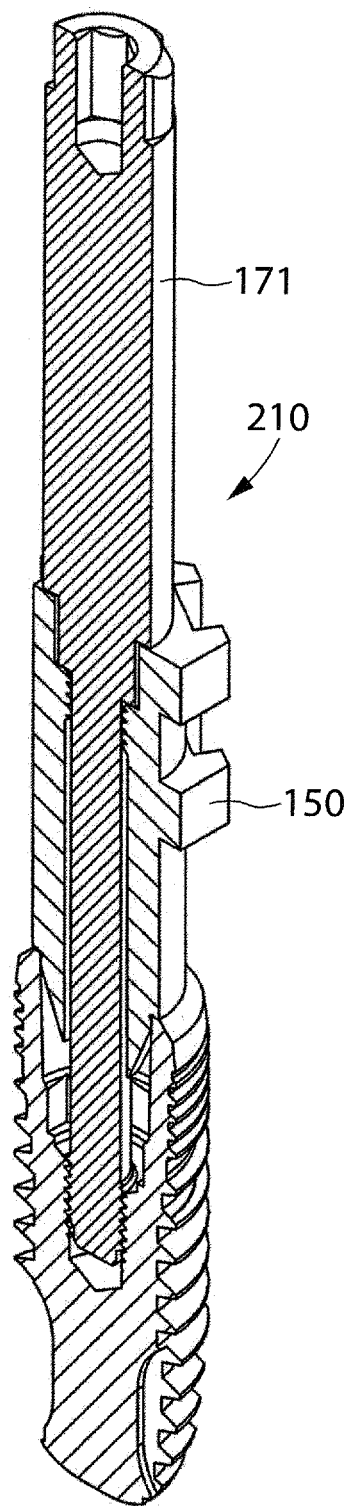
FIG. 20 shows the implant set according to FIG. 19 in a perspective section.
Figure 21:
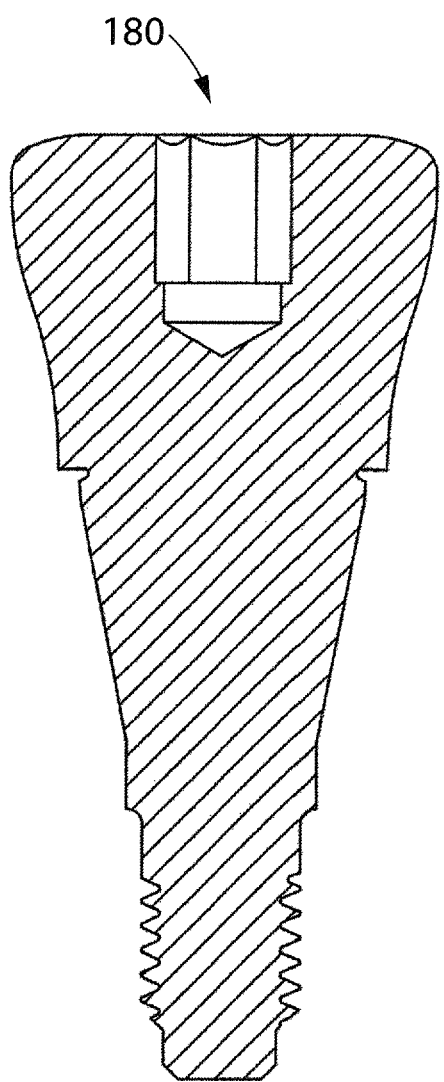
FIG. 21 shows a gingiva-former for an implant set in a preferred embodiment in a side section.
Figure 22:
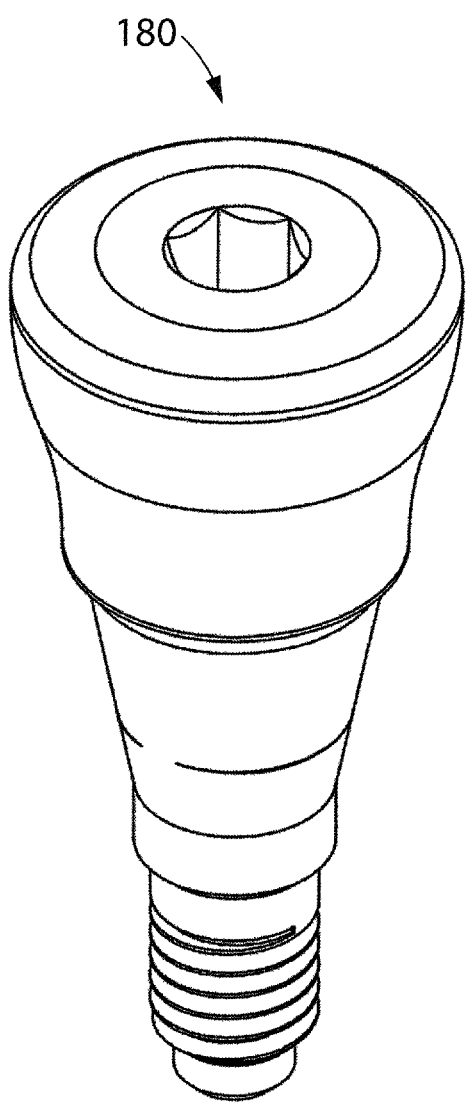
FIG. 22 shows the gingiva former according to FIG. 21 in a perspective view.
Figure 23:
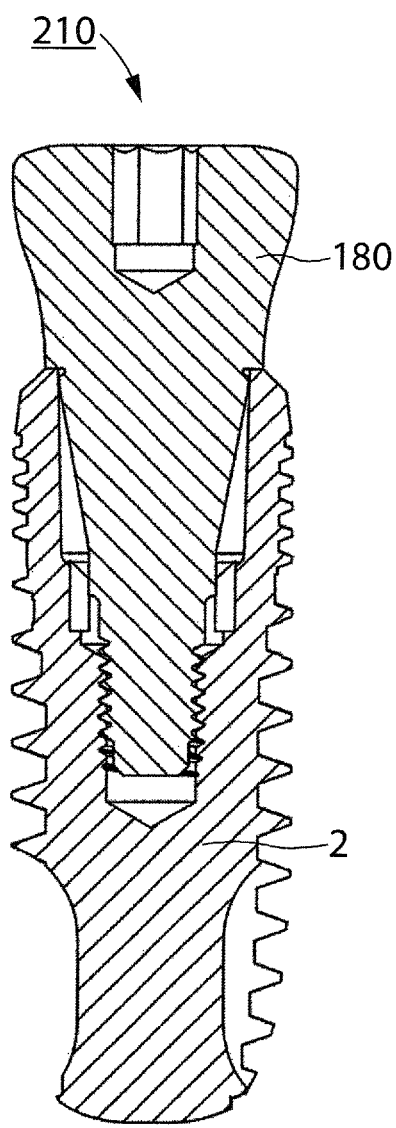
FIG. 23 shows an implant set with a gingiva former according to FIGS. 2 and 22 and a dental implant according to FIGS. 1 to 3 in a preferred embodiment in a side section.
Figure 24:
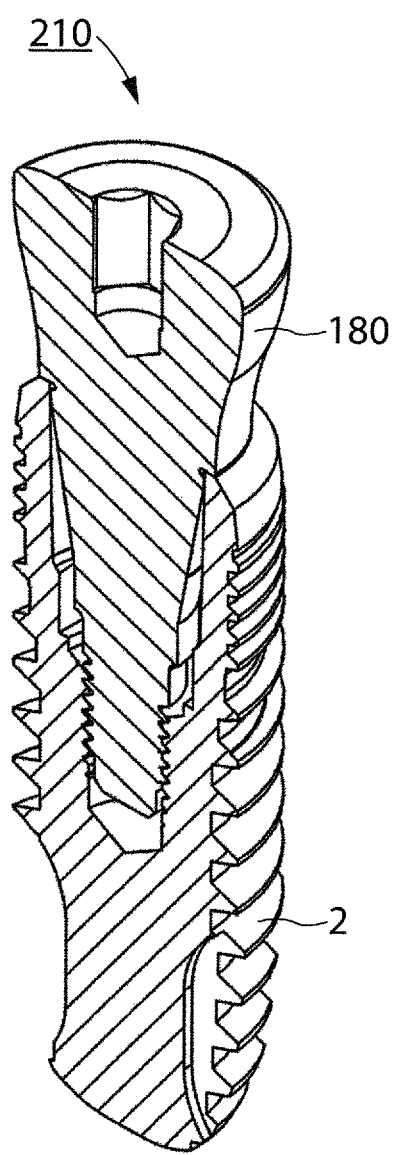
FIG. 24 shows the implant set according to FIG. 23 in a perspective section.

An impression post 150 shown in the FIGS. 16 to 18 in a second preferred embodiment has an indexing section with four cams 162 which adjoins an insertion section which is configured as a cylindrical transition region 153, which cams can be brought in engagement with the grooves 56 of the dental implant during the impression to form a form fitting connection, so that the orientation or indexing of the implant in the human jaw can be transferred to a (master) model. The connection design starts after the support shoulder with a short (0.3 mm long) taper 151 whose angle follows with the conical angle of the implant. Adjoining thereon is a further taper 155 whose angle is significantly greater. The second taper ends in a cylindrical transition region 153, which represents the transition to the indexing region 158.

Figure 27:
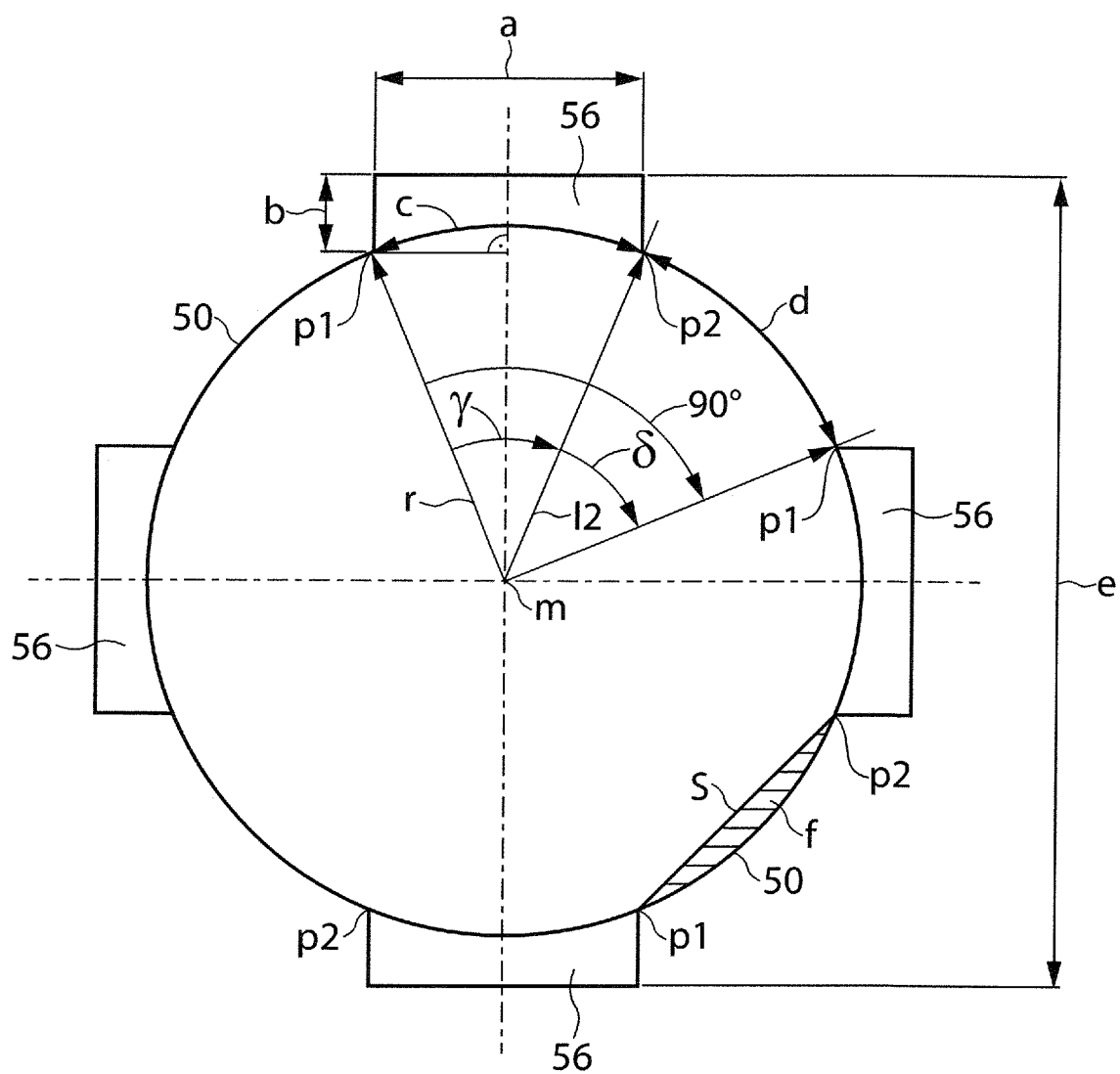

FIG. 27 schematically shows the cross section of the dental implant 2. Arranged along the circular circumference 50 are four grooves 56. The radius of the circle which defines the circular circumference 50 is designated r. The respective groove 56 has two contact points $p_1$, $p_2$ in the circular circumference 50. The circular section or the angle which covers the circular section which lies between these contact points $p_1$, $p_2$ is a groove angle γ or an opening angle, the correspondingly covered groove arc length of the circle is c. Between the contact point $p_2$ and one of the contact point $p_1$ of a neighboring groove 56 a section of the circular circumference 50, whose free arc length is referred to as d, is covered, wherein an associated free angle is referred to as δ. The groove angle γ or the opening angle is the angle between two imagined lines $l_1$ and $l_2$ which extend through the center of the circle, which circle defines the circular circumference 50, and through the contact points $p_1$, $p_2$. The following relationships apply:

$$\gamma = 2*\arcsin\frac{\frac{\pi}{2}}{r}, c = \frac{\pi*r*\gamma}{180}, d = \frac{\pi*r*90}{180} - c$$

Hereby, the units of γ and δ are degrees (°), c and d are respectively expressed as arc length. The ratio of free angle to groove and $l_f$, i.e., δ/γ or d/c in the dental implant 2 shown in FIG. 1 ff is 0.61.

A ratio in the range of 0.61 and 0.84 is hereby particularly advantageous because it results in a mechanically favorable ratio between depth of the grooves or side surface b and total distance of the grooves to each other. As a result of the relatively wide end faces a, the side surface depth b increases proportionally. The side surface depth b should be as great as possible for transmitting the required insertion torques and for avoiding a cold welding. On the other hand the total distance of the grooves e should be as small as possible so that the cross sectional surface of the implant body and the geometrical moment of inertia under bending and torsional load is as great as possible.

Further a highest manufacturing precision is easier to ensure for a wide groove (end face width a) and shallow groove (side surface depth b) than for a narrow and deep groove.

Finally in the case of a wide groove the enclosed hollow space or a volume f, namely in a certain sense the hollow space of the index intermediate region which is defined by the plane between an arc length of the circular circumference between two grooves which are delimited by a contact point $p_2$ of a groove and the contact point $p_1$ of a neighboring groove and secant s which runs through these two points and a line lf which is perpendicular thereto. This minimizes the possible contamination of the implant interior with fluids an bacteria.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An implant system, comprising a dental implant for insertion in a jaw bone, said implant having a receiving opening arranged on a coronal end of the dental implant, said receiving opening when viewed from the coronal end having a taper section and an indexing section, the indexing section having four outwardly extending grooves arranged along a circular circumference, the taper section having a taper angle of less than 3', each of said four outwardly extending grooves having two parallel straight side surfaces opposing each other in circumferential direction of the dental implant, said two parallel straight sides being perpendicular to and extending 0.1 mm to 0.4 mm from a common straight end surface arranged perpendicular to an imagined line which extends radially from a center axis of the implant, wherein a ratio of a section of the circular circumference along which no grooves are arranged and a section of the circular circumference along which the grooves are arranged is between 0.61 and 0.84 which provides a mechanically favorable ratio between a depth of the grooves and a total distance of the grooves to each other; and an abutment having an indexing section with four cams engaging with the four grooves of the dental implant.

2. The implant system of claim 1, wherein the taper angle is between 1" and 2".

3. The implant system of claim 2, wherein the taper angle is 1.4°.

4. The dental system of claim 1, wherein the side surfaces have a length of 0.8 mm to 1.5 mm.

5. The dental implant of claim 4, wherein the side surfaces have a length of 1 mm.

6. The dental system of claim 1, wherein a circular support surface for supporting introduction of the abutment is formed on the indexing section.

7. The dental system of claim 1, wherein an inner screw threading adjoins the indexing section viewed from the coronal end.

8. An implant system, comprising:

a dental implant for insertion in a jaw bone, said implant having a receiving opening arranged on a coronal end of the dental implant, said receiving opening when viewed from the coronal end having a first taper section and an indexing section, the indexing section having four outwardly extending grooves arranged along a circular circumference; and an abutment received in the receiving opening of the dental implant, said abutment comprising a second taper section and a cylindrical guide section receivable in the indexing section of the dental implant, the first taper section and the second taper section having an angle of less than 3°, each of said four outwardly extending grooves having two parallel straight side surfaces opposing each other in circumferential direction of the dental implant, said two parallel straight sides being perpendicular to and extending 0.1 mm to 0.4 mm from a common straight end surface arranged perpendicular to an imagined line which extends radially from a center axis of the implant, said first and second taper sections being dimensioned so as to contact each other at least partially, wherein a ratio of a section of the circular circumference along which no grooves are arranged and a section of the circular circumference along which the grooves are arranged is between 0.61 and 0.84 which provides a mechanically favorable ratio between a depth of the grooves and a total distance of the grooves to each other.

9. An implant set comprising:

a least one dental implant, said at least one dental implant having a receiving opening arranged on a coronal end of the dental implant for an abutment, said receiving opening when viewed from the coronal end having a taper section and an indexing section, the indexing section having four outwardly extending grooves arranged along a circular circumference, the taper section having a conical angle of less than 3", each of said four outwardly extending grooves having two parallel straight side surfaces opposing each other in circumferential direction of the dental implant, said two parallel straight sides being perpendicular to and extending 0.1 mm to 0.4 mm from a common straight end surface arranged perpendicular to an imagined line which extends radially from a center axis of the implant; and
at least one auxiliary element selected from the group consisting of impression post gingiva-forcer and insertion post,
wherein a ratio of a section of the circular circumference along which no grooves are arranged and a section of the circular circumference along which the grooves are arranged is between 0.61 and 0.84 which provides a mechanically favorable ratio between a depth of the grooves and a total distance of the grooves to each other.

* * * * *

UNITED STATES PATENT AND TRADEMARK OFFICE
CERTIFICATE OF CORRECTION

Page 1 of 1

PATENT NO.           : 10,695,149 B2
APPLICATION NO.      : 14/341237
DATED                : June 30, 2020
INVENTOR(S)          : Marcus von Malottki and Wilfried Schilli It is certified that error appears in the above-identified patent and that said Letters Patent is hereby corrected as shown below:

On the Title Page

[56] FOREIGN PATENT DOCUMENTS
Replace "WO 2011/039057 03/2011" with the correct --WO 2011/039057 07/2011--.
Replace "CN 201160908 12/2009" with --CN 201160908 12/2008--.

In the Claims

In Column 12, Claim 2, Line 14 replace ",,1"and 2""" with --1° and 2°--.
In Column 12, Claim 9, Line 65, replace "3""" with --3°--.
In Column 13, Claim 9, Line 7, replace "gingiva-forcer" with --gingiva-former--.

Signed and Sealed this
Twelfth Day of January, 2021

Andrei Iancu
*Director of the United States Patent and Trademark Office*